United States Patent [19]
Cherfane

[11] Patent Number: 5,180,082
[45] Date of Patent: Jan. 19, 1993

[54] FOAM DISPENSING GUN WITH IMPROVED DISPENSER MODULE

[75] Inventor: Raymond Cherfane, Stone Mountain, Ga.

[73] Assignee: Flexible Products Company, Marietta, Ga.

[21] Appl. No.: 777,802

[22] Filed: Oct. 17, 1991

[51] Int. Cl.$^5$ .............................................. B67D 5/60
[52] U.S. Cl. .................................... 222/145; 222/149; 222/504
[58] Field of Search ............... 222/145, 148, 149, 504; 239/112, 113, 591, 418, 443, 444, 499, 600, 590; 277/DIG. 6, 102, 112, 117, 110

[56] References Cited

U.S. PATENT DOCUMENTS

| | | | |
|---|---|---|---|
| 4,469,251 | 9/1984 | Sperry et al. | 222/145 X |
| 4,471,888 | 9/1984 | Herb et al. | 222/145 X |
| 4,523,696 | 6/1985 | Commette | 222/148 X |
| 4,568,003 | 2/1986 | Sperry et al. | 222/145 |
| 4,898,327 | 2/1990 | Sperry et al. | 222/148 X |
| 4,993,596 | 2/1991 | Brown | 222/145 |

*Primary Examiner*—Andres Kashnikow
*Assistant Examiner*—Kenneth Bomberg

*Attorney, Agent, or Firm*—Lockwood, Alex, FitzGibbon & Cummings

[57] ABSTRACT

A new and improved foam dispenser gun comprises in combination a gun body, a mountable dispenser moldule and an air cylinder actuator assembly. The dispenser module includes a dispenser housing and a valving insert received therein having a stepped outer configuration. The insert includes a forward minor diameter portion having a diametrical dimension slightly less than that of the housing passageway. The rearward major diameter portion of the insert is designed for press-fit engagement in the housing passageway. The clearance provided between the forward end of the housing passageway and the forward minor diameter portion of the insert, in accordance with the present invention, permits relaxation of the insert member in a controlled manner in use which reduces or eliminates the buildup of residual stresses on the insert member which are believed to be responsible for cold flow deformations of the insert. A reduction in cold flow deformation of the insert provided by the simplified structure of the dispenser module of the invention leads to a prolonged use life for the cartridges.

15 Claims, 5 Drawing Sheets

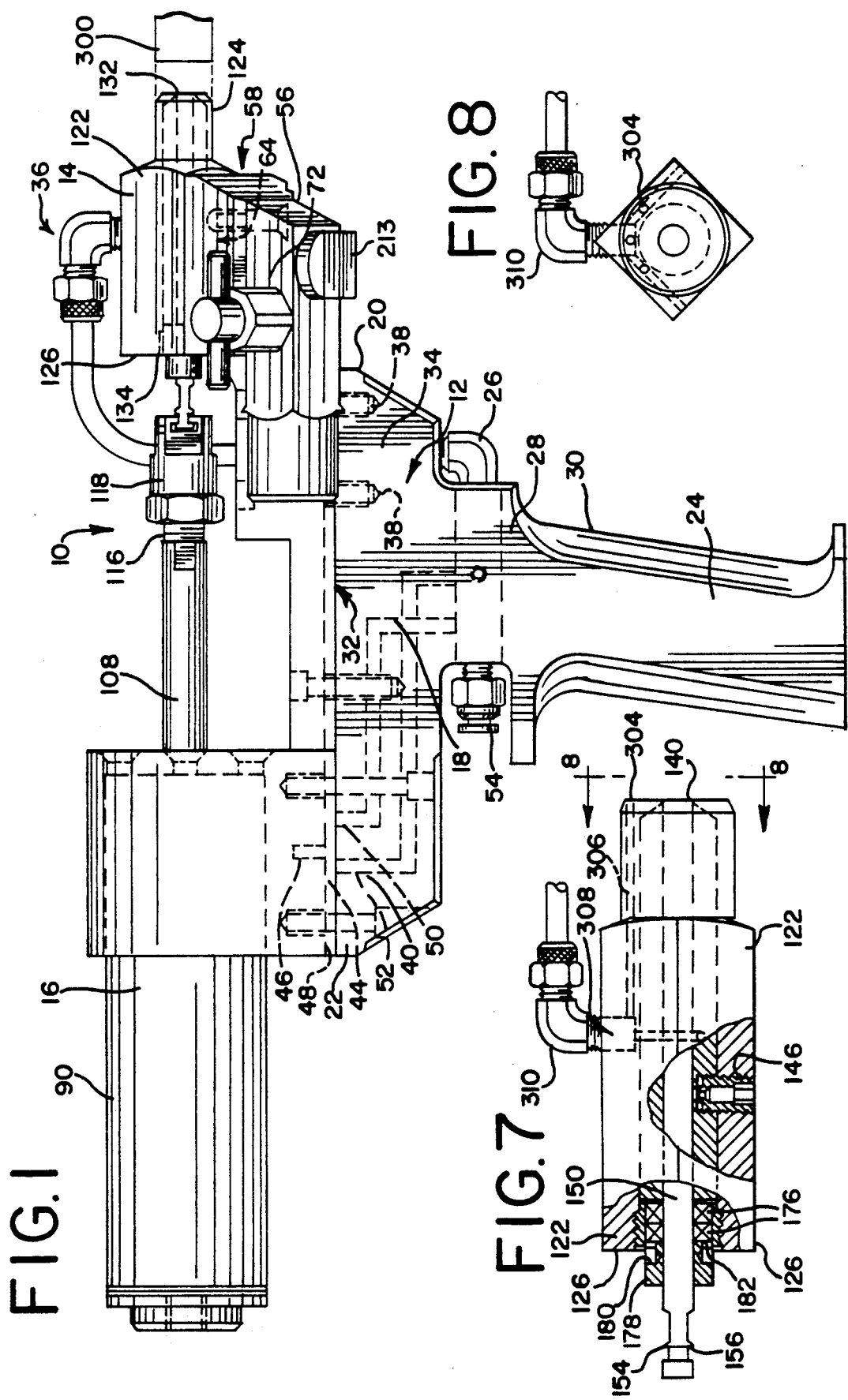

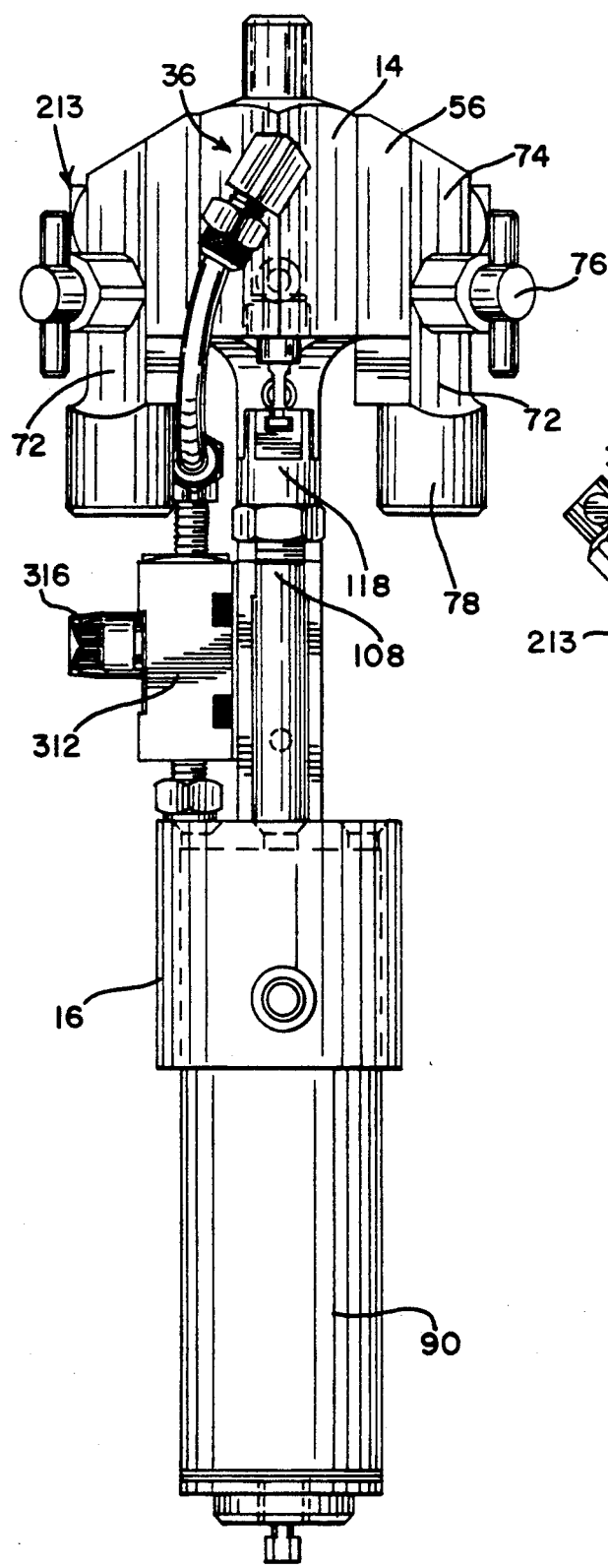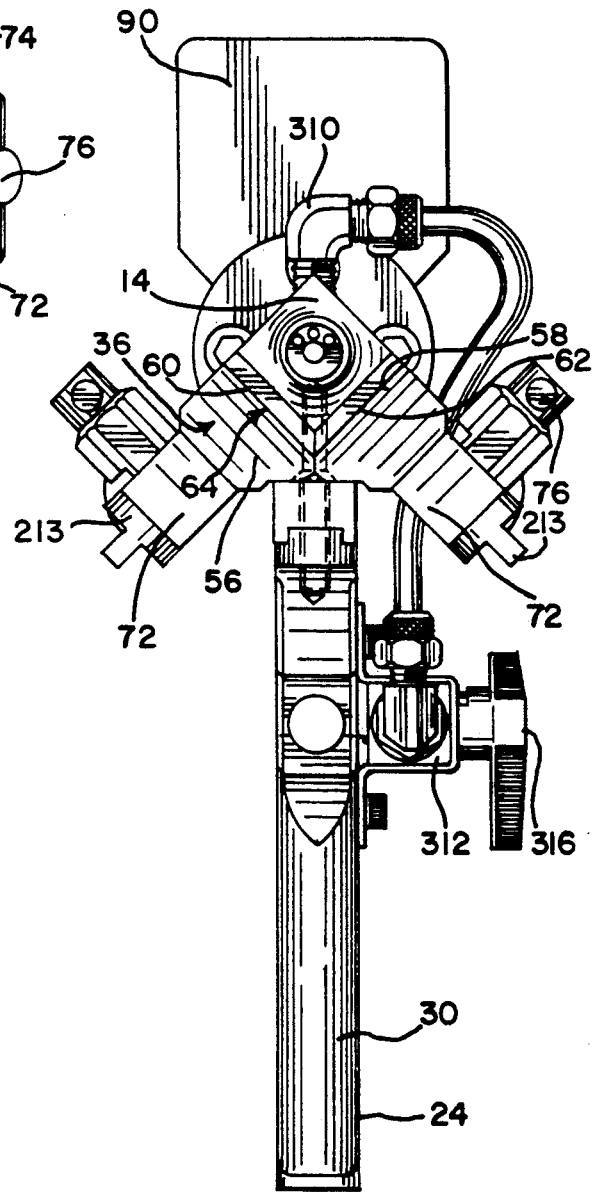

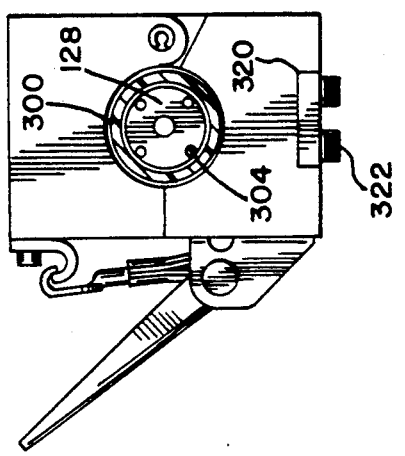
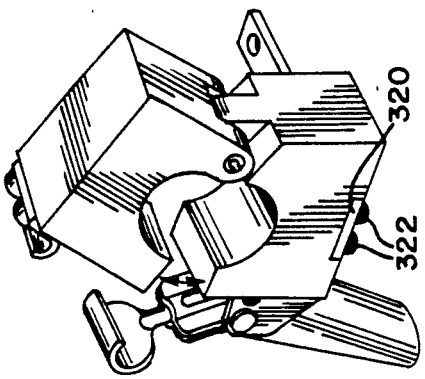
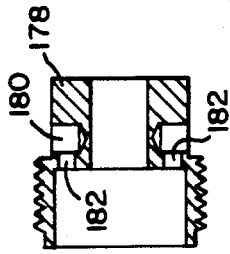
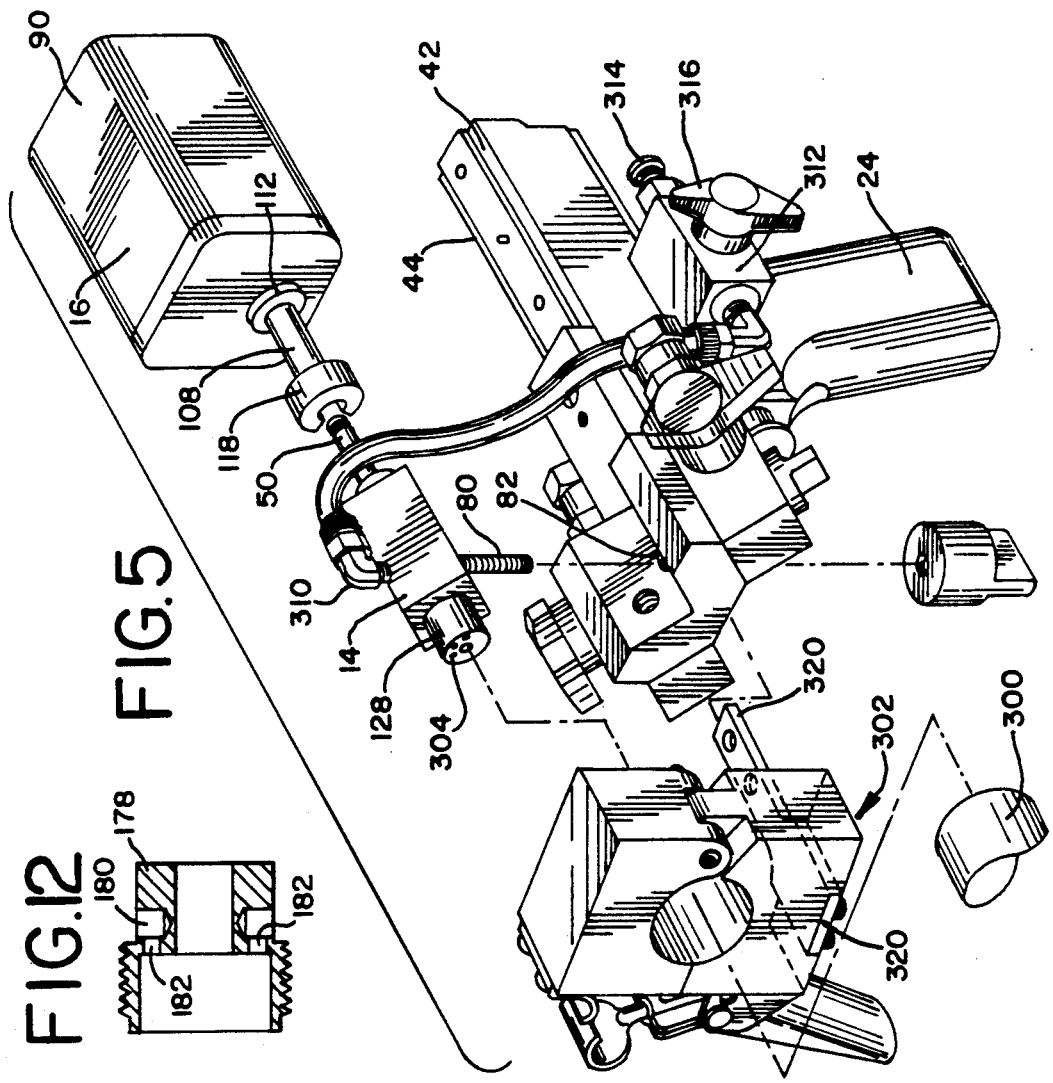

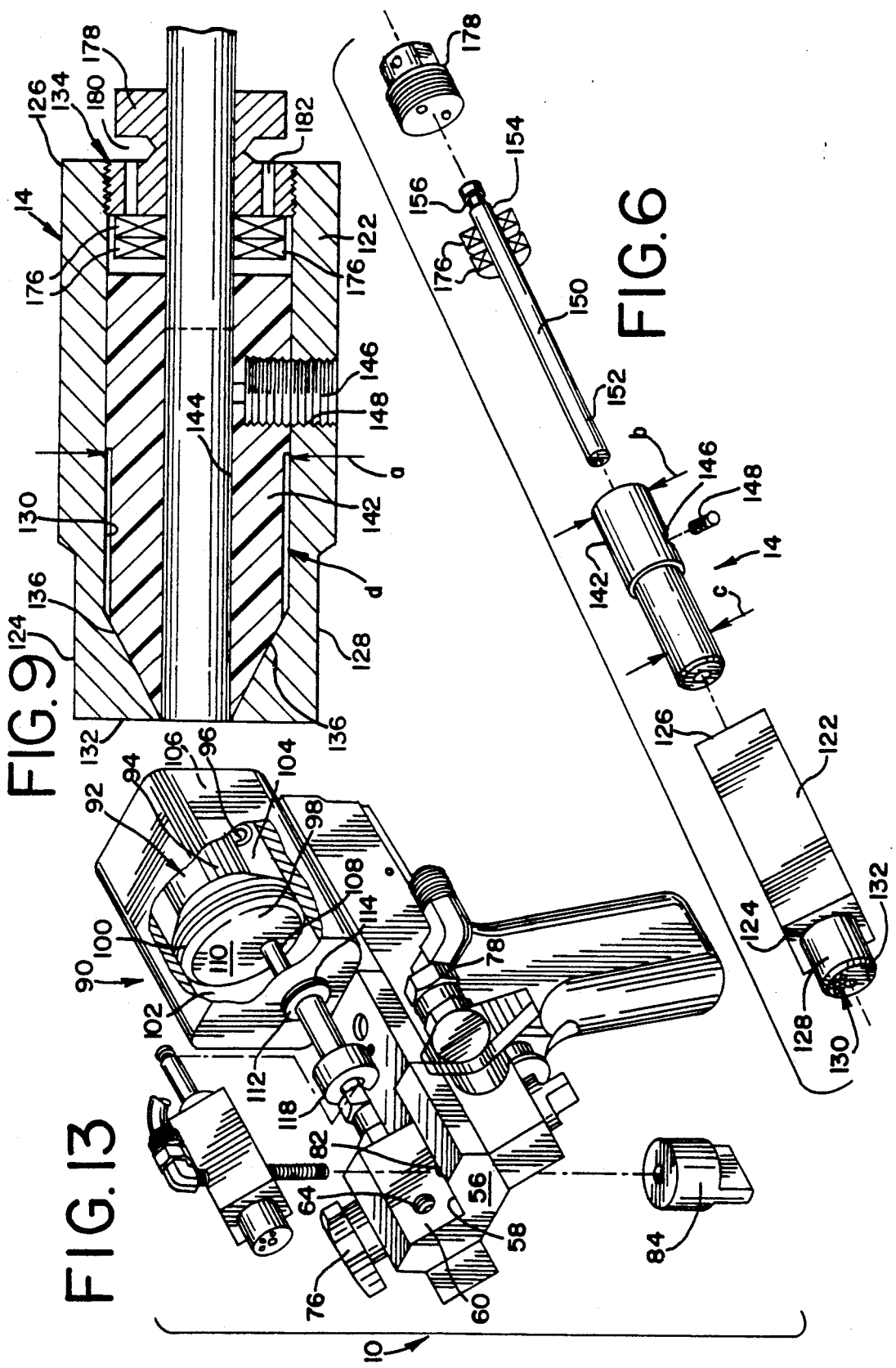

FOAM DISPENSING GUN WITH IMPROVED DISPENSER MODULE

BACKGROUND OF THE INVENTION

The present invention generally relates to hand held guns used for mixing and dispensing reactive chemical foam compositions, such as curable polyurethane foams. More particularly, it relates to a new and improved dispenser gun and dispenser module including valving elements which may be selectively compression loaded to provide improved sealing and dispensing performance and extended module service life.

Reactive chemical foam compositions, such as curable polyurethane foams, are presently well known and used in a number of different applications. The curable foam compositions typically comprise a two-part composition and, in the case of polyurethane foams, one part of the composition includes a polyol component and the other part includes an isocyanate component. Chemical foaming agents, curing agents, catalysts or accelerators, as well as other modifying additives, may be incorporated in one or both of the component parts. These two-parts of the foaming composition are separately stored in different containers until use.

For use, the two parts of the composition are rapidly mixed together. A rapid cross linking reaction and foam expansion commences which ultimately yields a resilient, low density, but relatively high load bearing urethane rigid foam. Expanding chemical foams are useful in such applications as thermal insulation, in floatation, in coatings and, more recently, the foams have been used in the specialty packaging industry.

According to present practice, the urethane components including the resin or polyol component and the isocyanate component are stored under pressure in containers which are attached to a hand held discharge gun by means of various hoses and couplings. The gun includes a trigger operated dispenser valve designed to permit the two-parts of the composition to flow through the hoses and into a mixing chamber wherein the products are rapidly mixed to form a reactive and expanding chemical foam composition which exits through a foam discharge nozzle or opening.

In these dispensing guns, the components are mixed by direct or indirect impingement with each other under conditions of high pressure to ensure thorough mixing. The design of the discharge valves and nozzles has become a matter of concern in the art. The component parts of the foam composition are highly chemically reactive and begin to form cured polymeric products within a matter of seconds. Premature leaking and mixing of the components within the dispensing nozzles is a serious and major concern because leakage results in undesirable curing in the nozzle causing blockage and damage to the nozzles in use. As a result, the nozzles have to be frequently replaced at considerable expense. Providing adequate seals within the nozzle assemblies in the high pressure environment has been another major problem to those in the art.

Prior art foam dispensing guns are known, for example from U.S. Pat. No. 4,469,251, U.S. Pat. No. 4,568,003 and from U.S. Pat. No. 4,993,596. In accordance with these prior dispensing gun arrangements, a detachable dispensing module includes a mixing chamber defined in a central bore within a polymeric insert. Typically, the polymeric insert is formed of a TEFLON ® material because the reactive foam composition and its components are not adherent to the TEFLON ® surfaces along the interior of the bore.

More particularly, the TEFLON ® insert has a central bore extending longitudinally therethrough. A plurality of openings extend through a sidewall of the insert in communication with the bore for supplying the organic resin and the isocyanate components into the mixing chamber. A valving rod is provided in a slidable interference fit within the bore to control the flow of organic polyol resin component and isocyanate component from the side openings into the mixing chamber and discharge of the foam therefrom. Although the inserts exhibit non-adherent surface characteristics, TEFLON ® materials are notorious for suffering from hysteresis or cold flow dimensional instability. Cold flow of the TEFLON ® material causes a distortion or a change in the critical dimensions of the central bore and the side openings of the insert. Over time this often results in a loss of the interference fit between the valving rod and the insert. As a result, the ability of the valving rod to effectively seal the openings to thereby prevent leakage of the reactive components into the mixing chamber is lost. Leakage ultimately causes obstruction within the mixing chamber which renders the dispensing module generally inoperable.

In an effort to overcome the tendency of the valving inserts to undergo cold flow deformation with a consequent loss in sealing and usefulness, conventional dispenser cartridges or modules have been provided with means for applying a constant axial and radial compressive load against polymeric insert member. Applying a constant radial and axial loads on the insert tends to reduce some of the cold flow induced failures of the prior art nozzles. Applying a constant radial and axial load increases frictional forces developed between the valve insert and the valving rod which tends to increase the residual stresses on the insert responsible for cold forming. Presently, the frequency of failure is still undesirably high in view of the expense associated with replacement and repair of the mixing chamber/dispensing modules.

Accordingly, to overcome the disadvantages of the prior art dispensing guns, it is an object of the present invention to provide a new and improved foam dispensing gun including a dispenser module characterized by prolonged or extended use lives.

It is another object of the present invention to provide a foam dispensing gun including a new and improved dispensing module which applies a compressive load against the polymeric valving insert in a critical seal area.

It is a further object of the present invention to provide a new and improved dispenser module for use in foam dispenser guns having a compression loaded polymeric insert designed to permit relaxation of the polymeric insert in a controlled manner so that cold flow deformations should they occur, occur outside the critical seal area.

It is another object of the present invention to provide a new and improved dispenser gun for foam compositions including a dispenser module adapted to receive a foam discharge guide member in the form of a tube or hose extension received over the discharge nozzle for re-directing discharged foam away from the gun to a desired target location.

It is still a further object of the present invention to provide a new and improved dispenser module for a foam dispensing gun adapted to receive a forward foam discharge guide including means for introducing a blast of air under pressure into the discharge guide behind a slug of dispensed foam to urge substantially all of the dispensed foam out of the discharge guide, to thereby purge the guide for the next shot of dispensed foam.

SUMMARY OF THE INVENTION

In accordance with these and other objects, the present invention provides a new and improved hand held gun for dispensing a reactive chemical foam composition. The new and improved foam dispenser gun comprises, in combination, a gun body including means defining a socket for receiving a dispenser module and including means for independently conducting chemical components of the chemical foam composition, e.g., an isocyanate component and a polyol component, from sources of the components to the socket under pressure. The dispenser module is adapted to be received in the socket defined in the gun body and includes a rigid elongate housing having a peripheral sidewall, a front discharge end with a foam discharge opening and an opposed rear end with a rear opening. An elongate passageway is defined in said housing which extends between and interconnects the front discharge opening and the rear opening. A pair of chemical side entry ports are provided which extend through the housing sidewall at a point intermediate the front discharge end and said rear end, in fluid communication with the elongate passageway.

In accordance with the invention, the new and improved dispenser module also comprises a thermoplastic insert member having a front end surface with a foam dispense opening and a rear end surface having a rod-receiving opening. The insert member includes a central core aperture extending therethrough between the foam dispense opening and the rod-receiving opening and a pair of side openings. The foam dispense opening of the core aperture at the front end of the insert has substantially the same configuration and dimensions as the foam discharge opening of the housing.

In accordance with the preferred embodiment, the thermoplastic insert member includes a stepped outer configuration having a stepped shoulder defined along the outer surface of the insert, at a point intermediate its length. The stepped shoulder defines a forward minor cross-sectional configuration portion extending forwardly from said shoulder to the front end surface of the insert and a rearward major cross-sectional configuration portion extending rearwardly from the shoulder to the rear end surface of the insert. The side openings are provided in the insert along the major cross-sectional configuration portion. The insert member is telescopically and press-fittingly engaged in the housing passageway so that the front end surface abuts the front discharge end and so that the foam dispensing opening is disposed in substantially leak-free, abutting registration with the foam discharge opening of the housing. In its fully loaded, forward, installed position within the housing, the rearward major cross-sectional configuration portion of the insert is press-fit into the passageway so that the side openings on the insert major portion are disposed in sealed, fluid-tight registering relation to the chemical side entry ports defined in the housing.

The dispenser module further comprises an elongate valving rod having a forward end portion slidably and sealingly engaged in the core aperture of the insert. The valving rod is movable or actuatable in said core aperture of the insert between a forward closed position, wherein the forward end portion extends within the foam dispense opening and along the length of the core aperture and a retracted open position wherein the forward end portion is spaced rearwardly from said foam dispense opening and the side openings thereby permitting chemicals to flow through the side entry ports and the side openings into the core aperture and out through the foam dispense and foam discharge openings.

In accordance with the preferred embodiment of the present invention, the stepped insert has a cylindrical configuration and provides the necessary sealed press fit engagement for the rearward major diameter portion within the housing adjacent the chemical side entry ports. The forward, minor diameter portion has a diametrical dimension slightly less than that of the housing passageway to provide a clearance between the forward ends of insert and passageway. The provided clearance, in accordance with the invention, permits relaxation of the insert member in a controlled manner while maintaining necessary seal retention or engagement between the insert and housing adjacent the side entry ports. The controlled relaxation of the insert reduces or eliminates the build up of residual stresses in the insert believed to be responsible for cold flow deformation of the insert. The clearance provided by the new and improved dispenser insert and module design provides that cold flow of the insert, should it occur, will generally occur in a controlled manner in pre-determined locations designed to maintain and promote critical component entry seals between the insert and housing. Controlling cold flow distortion of the insert member leads to substantially reduced leakage and improved module use life.

In accordance with the preferred embodiment, the insert member is preferably formed from a thermoplastic material such as TEFLON ® or other fluorocarbon material which exhibits a non-adherent surface characteristic to the foam composition and its components. The gun of this invention also includes: means for mounting the module relative to the socket and means for moving the valving rod between the open and closed positions.

In accordance with a preferred embodiment, the means for moving the valving rod between the open and closed positions comprises an air cylinder and piston actuator. Also in the preferred embodiment, the dispenser module is provided with a forwardly extending cylindrical projection at the front end of the housing adapted to slidably, telescopically receive a foam dispenser guide member in the form of a hose or tube extender. Foam discharged through the projecting front foam discharge opening travels along the guide member to a desired target location. In order to force a slug of foam to travel completely out of the guide tube or hose, in accordance with an alternate aspect of this invention, at least one air purge aperture is defined in the front discharge face on the projecting cylindrical portion of the housing. The air purge aperture(s) are connected by small air ducts to a selectively controllable source of forced air. Mounting means for mounting the guide hose or tube member in air tight relation onto the forwardly projecting cylindrical nose portion of the housing are also provided. The air purge system introduces a shot of forced air into the guide tube member behind an amount of previously dispensed foam to hydrostatically cause expulsion of the foam from the guide tube.

In accordance with the present invention, cold flow related dispenser valve failures may be reduced or eliminated and the useful life of a dispenser module may be extended by providing the stepped insert and housing of the present invention.

Other objects and advantages of the present invention will become apparent from the following detailed description taken in conjunction with the drawings in which:

BRIEF DESCRIPTION OF THE DRAWINGS

FIG. 1 is a side elevation view of the new and improved hand held chemical foam dispensing gun in accordance with the present invention shown with a foam dispenser guide extender tube exploded from a front end portion thereof;

FIG. 2 is a top plan view of the new and improved dispenser gun shown in FIG. 1;

FIG. 3 is a front elevation view of the new and improved dispenser gun shown in FIG. 1;

FIG. 5 is an exploded perspective view of the new and improved dispenser gun of the preferred embodiment;

FIG. 6 is an exploded perspective view of the new and improved dispenser module in accordance with the present invention;

FIG. 7 is a side elevation view, partly in section, of the preferred dispenser module in accordance with the invention;

FIG. 8 is a front elevation view of the preferred dispenser module taken along view lines 8—8 in FIG. 7;

FIG. 9 is an elevated cross-sectional view of the new and improved dispenser module of the invention;

FIG. 10 is a front elevation view of the foam guide tube mounting means in accordance with the preferred embodiment for securing a guide tube onto a projecting discharge nose portion of the preferred dispenser module;

FIG. 11 is a perspective view of the mounting means shown in FIG. 10 in an open condition;

FIG. 12 is an elevated cross-sectional view of the end cap for the dispenser module in accordance with the preferred embodiment; and FIG. 13 is a perspective view of the gun assembly of the present invention with portions of the air cylinder housing cut away to reveal the double headed piston drive mechanism for actuating the valving rod of the dispenser module.

DETAILED DESCRIPTION OF THE PREFERRED EMBODIMENTS

Figure 4:
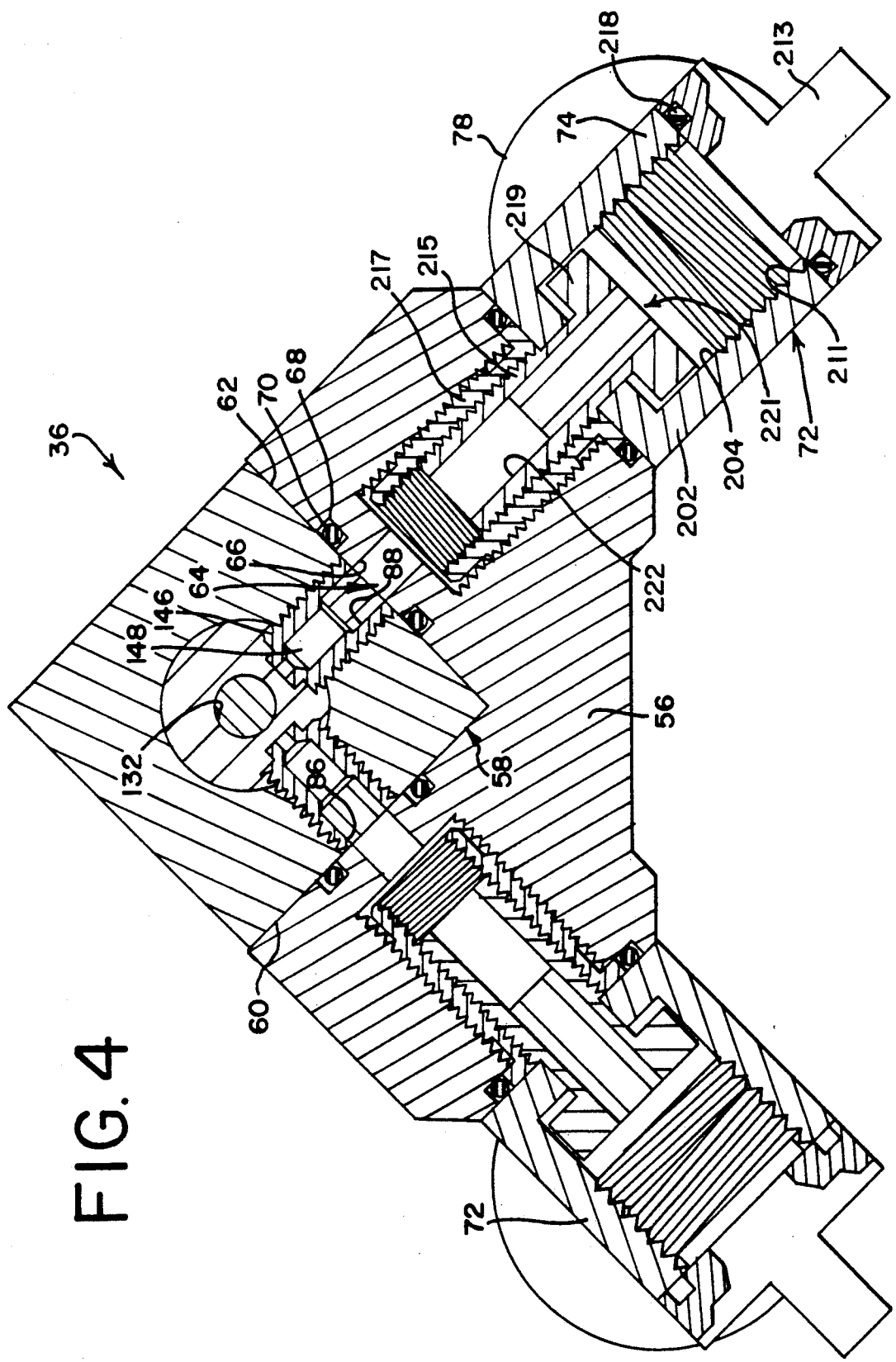
FIG. 4 is an elevated cross-sectional view of the chemical entry ports, gun socket and dispenser module in accordance with the preferred embodiment of the invention taken along view lines 4—4 in FIG. 1.

Referring now to FIG. 1, the new and improved hand held gun for dispensing reactive chemical foams, generally referred to by reference number 10, is shown. In the preferred embodiment depicted therein, foam dispenser gun 10 includes three major parts or elements in the form of a gun body 12, a dispenser module 14 and an air cylinder actuator assembly 16.

Gun Body 12 includes an elongate generally rectangular upper body portion 18 having a front end 20 and an opposed rear end 22. A pistol grip handle portion 24 extends downwardly from the upper body portion 18 to provide convenient means for holding gun 10 in one hand. A plunger type button trigger 26, is shown projecting forwardly from an upper section 28 of the front surface 30 of handle grip portion 24.

The upper surface 32 of upper body portion 18 includes a forward mounting portion 34 adapted to receive a removable product mixing and dispensing assembly 36, shown already mounted to forward mounted portion 34 by means of threaded mounting screws 38 received in threaded screw-receiving mounting apertures (not shown) defined in upper surface 32. Upper surface 32 also includes a rearward mounting portion 40 adapted to receive air cylinder actuator assembly 16. A pair of downwardly stepped shoulder grooves 42, 44 extending on opposed sides of upper surface 32 and a raised positioning pin 46 extending upwardly from upper surface 32 are each provided to cooperatively engage and mate with complementary structures defined in the bottom surface 48 of air actuator assembly 16, to positively position actuator assembly 16 onto rearward mounting portion 40. In mounted position, pressurized air apertures 50 and 52 defined in upper surface 32 are disposed in air-tight relation with O-ring sealed inlet-outlet apertures defined in bottom surface 48 for operating air cylinder actuator 16.

A pressurized air inlet fitting 54 extends from upper body portion 32 for delivering pressurized air to an air circuit defined within gun body 12. The air circuit includes the trigger 26 and each air apertures 50 and 52. More particularly, and in accordance with well known arrangements, pressurized air from a regulated outside source enters through inlet fitting 54 and travels to a chamber within gun body 12. A rear stem portion of trigger 26 carrying an obstructive O-ring seal is disposed in the chamber. A pair of air passages extend from a pair of laterally spaced exit openings disposed in the chamber to air apertures 50 and 52. When the trigger is in its forwardly extended closed or off position, the O-ring on the trigger shaft blocks the passage to air aperture 50 causing the forced air to exit through the unblocked passage and out through air aperture 52. When trigger 26 is squeezed moving it to an inwardly displaced retracted or on position, the airway to air aperture 50 is opened and the airway to air aperture 52 is closed. Trigger 26 is biased, usually by means of a spring, to assume its forwardly displaced position. Accordingly, trigger 26 remains in an off position until finger pressure is applied and returns to the off position as soon as finger pressure is released. Appropriate venting paths extend in the air circuit in a conventional manner. Further details of the air circuit and trigger mechanism are provided in the above mentioned U.S. Pat. Nos. 4,469,251 and 4,568,003.

Referring now to the product mixing and dispensing assembly 36, shown mounted in FIGS. 1-4 to forward mounting portion 34, assembly 36 includes a valve carrier body 56 defining a socket 58 having a 90° V-groove configuration adapted to mountingly receive dispenser module 14. The inwardly sloping surfaces 60 and 62 defining V-groove socket 58 are each provided with a component delivery orifice 64 including an inner channel opening 66 surrounded by a concentric radially outer groove 68 receiving an O-ring 70.

A pair of substantially identical component inlet valve assemblies 72 extend outwardly from opposed sides of valve carrier body 56. Each component inlet valve assembly 72 includes a valve body 74, an operating knob 76 and a hose pressure coupling 78 adapted to receive delivery hoses from a source of the components. As shown in FIG. 3, 5 and 13, dispenser module 14 includes a depending threaded mounting stem 80 which is received through a mounting aperture 82 provided in socket 58. A coupling nut 84 threadedly engaged on stem 80 is rotated to tighten dispenser module 14 in mounted relation in socket 58 so that a fluid tight connection is made between channel openings 66 and a pair of component side entry ports 86, 88 (FIG. 4) provided in dispenser module 14.

Referring now in greater detail to the air cylinder actuator assembly 16 shown in FIGS. 1, 5 and 13, actuator assembly 16 includes pneumatic housing 90 defining an inner cylindrical chamber 92. A double headed piston member 94 including a rearward piston head 96 and a forward piston head 98 is mounted for slidable reciprocal movement in chamber 92. Rearward and forward piston heads 96, 98 are each provided with an O-ring type piston seal 100. Double headed piston member 94 subdivides chamber 92 into a forward section 102, a center section 104 and a rear section 106. The double headed construction of piston member 94 ensures smooth, cock-free movement of piston 94 within chamber 92. An actuator rod 108 extends forwardly from an off-center position in a forward face 110 of forward piston head 98 through a pressure seal 112 disposed in a forward opening 114 in pneumatic housing 90. The opposed free end 116 of actuator rod 108 has a valving rod coupler 118 affixed thereon.

Air aperture 50 in gun body 12 communicates with front section 102 of chamber 92 and air aperture 52 communicates with the center section 104 through sealed openings (not shown) in bottom surface 48 of pneumatic housing 90, as mentioned above. Vent openings 120 are provided in rear piston head 96 to equalize the pressures in chamber sections 104 and 106. As will be appreciated by those skilled in this art, when the trigger 26 is in its forwardly displaced off position, air pressure flows from air aperture 52 into chamber sections 104 and 106 while chamber section 102 is simultaneously vented. Pressurization of rear chamber 106 causes piston 94 to move forwardly within chamber 92, causing the free end 116 of actuator rod 108 to move away from pneumatic housing 90. When trigger 26 is squeezed chamber section 104 and 106 are vented and front chamber 102 is pressurized, driving piston 94 rearwardly in chamber 92, thereby causing free end 116 to move toward pneumatic housing 90.

The new and improved dispenser module 14 of the preferred embodiment is best shown in FIGS. 6, 7 and 9. Referring to the exploded view of FIG. 6, dispenser module 14 is shown to include a generally rectangular rigid housing 122 having a front end 124 and an opposed rear end 126. A cylindrical hose projection 128 extends forwardly from front end 124. Housing 122 includes a central, generally cylindrical passageway 130 extending the length thereof between a front foam discharge opening 132 and a rear opening 134 disposed in front end 124 and rear end 126, respectively. A front taper or chamber portion 136 is defined passageway 130 adjacent front end 124 and front discharge opening 132. Front taper portion 136 serves as a lead-in to properly position the insert member 142 within housing passageway 130.

Dispenser module 14 also includes a generally cylindrical stepped thermoplastic valving insert member 142 having a central core aperture 144 extending therethrough. A component side port 146 extends generally normally through a side of insert 142 into communication with central aperture 144. A rigid threaded orifice insert 148 is pressed into component entry port 146 after the insert 142 is telescopically inserted through rear opening 134 into housing core aperture 130.

An elongate valving rod 150 is provided including a forward end 152 a rearward end 154 having a locking groove 156.

Lastly, dispenser module 14 is shown to include a pair of lubricating felt washers 176 and a threaded rear end cap 178 provided with an outer lubricant introduction well 180 and lubricant introduction channel 182, best shown in FIGS. 6–7, 9 and 12.

Referring now to FIGS. 3–4, dispenser module 14 is assembled by installing the insert 142, rear end first onto the front end portion 152 of valving rod 150. This subassembly is telescopically and forcibly inserted through rear opening 134 in housing 122 into passageway 130 until the tapered front end of insert 142 is disposed at tapered front end 132 With the front end 152 of valving rod extending into foam dispensing opening 140, the rear end cap may be threaded securely in the rear opening of the housing. Thereafter the threaded orifice inserts 148 are disposed in liquid tight threaded relation and extend the component side openings 184 extending through lower housing sidewalls 186 and 188 which in turn sealingly cooperate with the component delivery orifices 64 defined in socket 58.

Referring now to FIG. 4, the gun of the invention derives a number of its advantages from a simple, modular construction. As shown in FIG. 4, each product inlet valve assembly 72 is identical to its counterpart and is contained in a valve housing generally designated 74. The housing includes sidewalls 202 defining a product passage 204 through which the product passes from the opening in the inlet fitting 78 (FIG. 3). The valve housing 74 includes a clean out opening 211 closed off by the knob 213. An O-ring seal 218 seals the clean out knob 213 against leakage relative to the housing 74. The valve housing 74 is secured to the valve carrier body 56 by a threaded valve screw 215 which is threadably engaged and received in a double threaded mounting insert 217. The end 219 of the threaded valve screw 215 may include a socket head or like tool-receiving area 221 to facilitate assembly and disassembly. In use the chemical component flows through the fitting 78 into chamber 204 and into a central passage 222 in the valve screw 215. The component thereafter passes through channel opening 66 to the entry orifice 64 in the socket 58.

In greater detail and referring now to FIGS. 6 and 9, the new and improved dispenser module 14 includes an insert having a stepped outward configuration with an intermediate shoulder defined therein. In the preferred embodiment shown in FIGS. 6 and 9, the insert has a generally cylindrical configuration including a minor diameter portion extending forwardly from the shoulder to the front face thereof and a major diameter portion extending rearwardly from the shoulder to the rear end of the insert. The rearward major diameter portion of the insert includes the component side openings therein.

As shown in FIG. 6, the cylindrical housing passageway has a substantially constant internal diameter, a, extending the length thereof, with the exception of the tapering front portion. The stepped insert includes a rearward major diameter portion, b, which is selected to provide a fluid-tight, press-fit or interference fit between the outer surface of the major diameter portion of the insert and the inner facing surfaces of the housing defining passageway 130. The forward minor diameter portion has a diameter, c, which is slightly less than a and b to provide clearance between the outer surface of the minor diameter portion and the forward sidewall surfaces defining passageway 130. The clearance indicated at d, provides controlled relief from stresses and ensuing cold flow deformation caused by repeated reciprocation of the valving rod between its closed and open and closed positions within the core aperture of the insert.

In accordance with a preferred embodiment, the dispensing gun will be used in an assembled form which includes a flexible or rigid, cardboard or plastic guide tube 300, indicated in FIGS. 1, 5 and 11. Guide tube 300 has an inner diameter selected to be closely slidably and telescopically received over the forwardly projecting nose portion of the housing. In addition to a press-fit engagement onto nose portion, a mounting means in the form of a manipulatable reclosable hose clamp 302 may be used to provide an air tight gripping engagement of the foam guide tube on the nose portion.

Manipulatable hose clamp 302 includes a pair of generally rectangular clamp halves each provided with aligned and opposing semi-circular cutouts to define circular clamping surfaces. The clamp halves are hingedly connected at one side thereof to permit them to be pivoted away from each other to permit installation and removal of a guide tube on the nose portion. A releasable manual actual cooperating latch is provided on the other sides of the clamp halves including a latch hook and a latch arm. Engaging the hook and latch arm and moving the latch lever arm to a closed position forces the confronting latch surfaces together forming an air tight seal between the foam guide and the nose portion of the housing.

In those embodiments or applications where the extender or foam guide is used it is preferable to provide a means for delivering a shot of forced air or other propellant gas to hydrostatically deliver a charge of previously dispensed foam travelling within the guide tube, completely out of the foam guide tube to prevent clogging. In accordance with this aspect of the invention air purge apertures 304 are defined in the front face of the nose portion of the housing radially outwardly from the foam discharge opening. The air purge apertures 304 are connected by discrete air passages 306 to a common purge air entry port 308 equipped with an air tight hose coupling, such as an NPT elbow 310 as shown. An air hose extends from elbow 310 to a purge air valve 312 mounted on the side of the gun body. The purge air valve 312 includes a pressurized air hose coupler fitting 314 and a rotatable valve knob 316 to open and close a valve to permit air to flow through this purge air circuit to exit within the foam guide tube through the purge air apertures 304. Providing a purge air circuit and means for purging the foam guide extenders permits the extenders to be reused and reduces their consumption. The clamp may be fixedly, rigidly mounted to a mounting plate 320 by mounting screws 322 which may, in turn, be mounted to the gun body by more mounting screws as shown in FIGS. 5 and 10-11.

Although the present invention has been described with reference to certain preferred embodiments, modifications or changes may be made therein by those skilled in this art without departing from the scope and spirit of this invention as defined by the appended claims.

We claim:

1. A hand held gun for dispensing a reactive chemical foam composition, said gun comprising, in combination, a gun body including means defining a socket for receiving a dispenser module and including means for independently conducting chemical components of said chemical foam composition from sources of said components to said socket under pressure, a dispenser module received in said socket and mounted to said gun body, said dispenser module including a substantially rigid elongate housing having a peripheral sidewall, a front discharge end with a foam discharge opening, an opposed rear end with a rear opening, an elongate passageway having an inner diametrical dimension defined in said housing extending between said front end and said rear opening and a pair of chemical side entry ports extending through said peripheral sidewall at a point intermediate said front discharge end and said rear end in fluid communication with said passageway, an elongate thermoplastic insert member including a front end surface having a foam dispense opening, a rear end surface having a rod-receiving opening, a central core aperture extending therethrough between said foam dispense opening and said rod-receiving opening, and a pair of side openings, said foam dispense opening of said core aperture having substantially the same internal diameter configuration and dimensions as said foam discharge opening, said insert member having an axial length dimension defined between said front end surface and said rear end surface, said insert member further including a stepped outer surface configuration having a step shoulder defined along said outer surface at a point intermediate the length of the insert, a forward minor cross-sectional configuration portion extending rearwardly from said front end surface to said step shoulder having an outer diametrical dimension and a rearward major cross-sectional configuration portion extending rearwardly from said step shoulder to said rear end surface, said side openings being disposed in said rearward major cross-sectional configuration portion, said insert member being telescopically and press-fittingly engaged in said housing passageway so that the front end surface abuts the front discharge end, said foam dispense opening is disposed in registration with said foam discharge opening and said side openings are disposed in sealed, fluid-tight registering relation with said chemical side entry ports, said outer diametrical dimension of said forward minor cross-sectional configuration portion of said insert being less than said inner diametrical dimension of said passageway such that clearance is defined therebetween for relaxation of said insert, said dispenser module further including an elongate valving rod having a forward end portion slidably and sealingly engaged in the core aperture of said insert, said valving rod being movable between a forward closed position wherein the forward end portion extends within said foam dispense opening and along the length of said core aperture, and a retracted open position wherein the forward end portion is spaced rearwardly from said foam dispense opening and said side openings, thereby permitting chemicals to flow through said side entry ports and said side openings into said core aperture and out through the foam dispense opening, said gun further including means for mounting the dispense module to the gun body, and means for moving the valving rod between said open and said closed positions.

2. The gun as defined in claim 1, wherein said housing passageway has a generally cylindrical cross-sectional configuration with a generally constant diametrical dimension over substantially the entire length of said passageway.

3. The gun as defined in claim 2, wherein said insert member has a generally elongate cylindrical configuration and said rearward major cross-sectional configuration portion has an outer cross-sectional diameter which is greater than said outer diametrical dimension of said forward minor cross-sectional configuration portion, and the outer cross-sectional diameter of said rearward major cross-sectional configuration portion is selected with respect to said inner diametrical dimension of said passageway such that upon substantially complete insertion of the insert into the passageway a sealed, fluid tight, press-fit engagement of the rearward major cross-sectional configuration portion of the insert in the housing passageway is provided.

4. The gun as defined in claim 3, wherein said insert member comprises a self-lubricating thermoplastic polymer composition.

5. The gun as defined in claim 4, wherein said insert member comprises a polytetrafluoroethylene thermoplastic polymer composition.

6. The gun as defined in claim 3, wherein the axial length dimension of said insert member is less than the length of said passageway.

7. The gun as defined in claim 6, wherein the front end of the passageway adjacent said foam discharge opening and radially outer portion of said front end surface of said insert are each provided with cooperating tapering lead-in surfaces to further promote registration of the foam dispense opening with said foam discharge opening when the insert is fully seated in said passageway.

8. The gun as defined in claim 7, wherein said rear opening of said housing includes a threaded portion and said gun further includes a rear end cap threadedly engaged in said rear opening with said valving rod extending therethrough, said rear cap including means for lubricating said valving rod disposed inside the rear end of said passageway and means defined in said rear end cap for receiving and supplying additional lubricant to said lubricating means from outside the rear end of the housing.

9. The gun as defined in claim 1, wherein said front discharge end of said housing includes a forwardly projecting cylindrical portion having a front discharge surface and said foam discharge opening is defined in said front discharge surface.

10. The gun as defined in claim 9, further including a foam discharge guide tube telescopically received on said projecting cylindrical portion of the front discharge end of the housing.

11. The gun as defined in claim 10, further including means for mounting an end of said foam discharge guide tube onto said projecting cylindrical portion in air tight relation therewith.

12. The gun as defined in claim 11, wherein said front discharge surface of said forwardly projecting cylindrical portion includes at least one air aperture defined therein communicating with an air duct and said gun further includes means for introducing a flow of air under pressure into said air duct and out through said air aperture into said foam discharge guide tube to purge any previously discharged foam out of said guide tube.

13. A hand held gun for dispensing a reactive chemical foam composition, said gun comprising, in combination, a gun body including means defining a socket for receiving a dispenser module and including means for independently conducting chemical components of said chemical foam composition from sources of said components to said socket under pressure, a dispenser module received in said socket and mounted to said gun body, said dispenser module including a substantially rigid elongate housing having a peripheral sidewall, a front discharge end with a foam discharge opening, an opposed rear end with a rear opening, an elongate passageway defined in said housing extending between said front end and said rear opening and a pair of chemical side entry ports extending through said peripheral sidewall at a point intermediate said front discharge end and said rear end in fluid communication with said passageway, an elongate thermoplastic insert member including a front end surface having a foam dispense opening, a rear end surface having a rod-receiving opening, a central core aperture extending therethrough between said foam dispense opening and said rod-receiving opening, and a pair of side openings, said foam dispense opening of said core aperture having an internal diameter configuration and dimension substantially the same as an internal diameter configuration and dimension of said foam discharge opening, said insert member having an axial length dimension defined between said front end surface and said rear end surface, said insert member further including a stepped outer surface configuration having a step shoulder defined along said outer surface at a point intermediate the length of the insert, a forward minor cross-sectional configuration portion extending rearwardly from said front end surface to said step shoulder and a rearward major cross-sectional configuration portion extending rearwardly from said step shoulder to said rear end surface, said side openings being disposed in said rearward major cross-sectional configuration portion, said insert member being telescopically and press-fittingly engaged in said housing passageway so that the front end surface abuts the front discharge end, said foam dispense opening is disposed in registration with said foam discharge opening and said side openings are disposed in sealed, fluid-tight registering relation with said chemical side entry ports, the front end of the passageway adjacent said foam discharge opening and a radially outer portion of said front end surface of said insert each being provided with cooperating tapering lead-in surfaces to further promote registration of the foam dispense opening with said foam discharge opening when the insert is fully seated in said passageway, said dispenser module further including an elongate valving rod having a forward end portion slidably and sealingly engaged in the core aperture of said insert, said valving rod being movable between a forward closed position wherein the forward end portion extends within said foam dispense opening and along the length of said core aperture, and a retracted open position wherein the forward end portion is spaced rearwardly from said foam dispense opening and said side openings, thereby permitting chemicals to flow through said side entry ports and said side openings into said core aperture and out through the foam dispense opening, said gun further including means for mounting the dispenser module to the gun body, and means for moving the valving rod between said open and said closed positions.

14. A hand held gun for dispensing a reactive chemical foam composition, said gun comprising, in combination, a gun body including means defining a socket for receiving a dispenser module and including means for independently conducting chemical components of said chemical foam composition from sources of said components to said socket under pressure, a dispenser module received in said socket and mounted to said gun body, said dispenser module including a substantially rigid elongate housing having a peripheral sidewall, a front discharge end with a forwardly projecting nose portion having a front discharge surface with a foam discharge opening defined therein and at least one air aperture defined therein communicating with an air duct, an opposed rear end with a rear opening, an elongate passageway defined in said housing extending between said front end and said rear opening and a pair of chemical side entry ports extending through said peripheral sidewall at a point intermediate said front discharge end and said rear end in fluid communication with said passageway, an elongate thermoplastic insert member including a front end surface having a foam dispense opening, a rear end surface having a rod-receiving opening, a central core aperture extending therethrough between said foam dispense opening and said rod-receiving opening, and a pair of side openings, said foam dispense opening of said core aperture having an internal diameter configuration and dimension substantially the same as an internal diameter configuration and dimension of said foam discharge opening, said insert member having an axial length dimension defined between said front end surface and said rear end surface, said insert member further including a stepped outer surface configuration having a step shoulder defined along said outer surface at a point intermediate the length of the insert, a forward minor cross-sectional configuration portion extending rearwardly from said front end surface to said step shoulder and a rearward major cross-sectional configuration portion extending rearwardly from said step shoulder to said rear end surface, said side openings being disposed in said rearward major cross-sectional configuration portion, said insert member being telescopically and press-fittingly engaged in said housing passageway so that the front end surface abuts the front discharge end, said foam dispense opening is disposed in registration with said foam discharge opening and said side openings are disposed in sealed, fluid-tight registering relation with said chemical side entry ports, said dispenser module further including an elongate valving rod having a forward end portion slidably and sealingly engaged in the core aperture of said insert, said valving rod being movable between a forward closed position wherein the forward end portion extends within said foam dispense opening and along the length of said insert aperture, and a retracted open position wherein the forward end portion is spaced rearwardly from said foam dispense opening and said side openings, thereby permitting chemicals to flow through said side entry ports and said side openings into said core aperture and out through the foam dispense opening, said gun further including means for mounting the dispense module to the gun body, and means for moving the valving rod between said open and said closed positions, said gun further including a foam discharge guide tube telescopically receivable over said projecting nose portion, means for mounting said guide tube in air tight relation over said nose projection and said gun further including means for introducing a flow of air under pressure into said air duct and out through said air aperture into said foam discharge guide tube to purge any previously discharged foam out of said guide tube.

15. A hand held gun for dispensing a reactive chemical foam composition, said gun comprising, in combination, a gun body including means defining a socket for receiving a dispenser module and including means for independently conducting chemical components of said chemical foam composition from sources of said components to said socket under pressure, a dispenser module received in said socket and mounted to said gun body, said dispenser module including a substantially rigid elongate housing having a peripheral sidewall, a front discharge end with a foam discharge opening, an opposed rear end with a rear opening having a threaded portion, an elongate passageway defined in said housing extending between said front end and said rear opening and a pair of chemical side entry ports extending through said peripheral sidewall at a point intermediate said front discharge end and said rear end in fluid communication with said passageway, an elongate thermoplastic insert member including a front end surface having a foam dispense opening, a rear end surface having a rod-receiving opening, a central core aperture extending therethrough between said foam dispense opening and said rod-receiving opening, and a pair of side openings, said foam dispense opening of said core aperture having an internal diameter configuration and dimension substantially the same as an internal diameter configuration and dimension of said foam discharge opening, said insert member having an axial length dimension defined between said front end surface and said rear end surface, said insert member further including a stepped outer surface configuration having a step shoulder defined along said outer surface at a point intermediate the length of the insert, a forward minor cross-sectional configuration portion extending rearwardly from said front end surface to said step shoulder and a rearward major cross-sectional configuration portion extending rearwardly from said step shoulder to said rear end surface, said side openings being disposed in said rearward major cross-sectional configuration portion, said insert member being telescopically and press-fittingly engaged in said housing passageway so that the front end surface abuts the front discharge end, said foam dispense opening is disposed in registration with said foam discharge opening and said side openings are disposed in sealed, fluid-tight registering relation with said chemical side entry ports, the front end of the passageway adjacent said foam discharge opening and a radially outer portion of said front end surface of said insert each being provided with cooperating tapering lead-in surfaces to further promote registration of the foam dispense opening with said foam discharge opening when the insert is fully seated in said passageway, said dispenser module further including an elongate valving rod having a forward end portion slidably and sealingly engaged in the core aperture of said insert, said valving rod being movable between a forward closed position wherein the forward end portion extends within said foam dispense opening and along the length of said core aperture, and a retracted open position wherein the forward end portion is spaced rearwardly from said foam dispense opening and said side openings, thereby permitting chemicals to flow through said side entry ports and said side openings into said core aperture and out through the foam dispense opening, said gun further including means for mounting the dispenser module to the gun body, means for moving the valving rod between said open and said closed positions and a rear end cap threadedly engaged in said threaded portion of said rear opening with said valving rod extending therethrough, said rear end cap including means for lubricating said valving rod disposed inside the rear end of said passageway and means defined in said rear end cap for receiving and supplying additional lubricant to said lubricant means from outside the rear end of the housing.

* * * * *